United States Patent [19]
Nakayama

[11] Patent Number: 5,510,658
[45] Date of Patent: Apr. 23, 1996

[54] CIRCUIT BREAKER DEVICE FOR ELECTRIC VEHICLE

[75] Inventor: Hitoshi Nakayama, Kawaguchi, Japan

[73] Assignee: Honda Giken Kogyo Kabushiki Kaisha, Tokyo, Japan

[21] Appl. No.: 241,849

[22] Filed: May 12, 1994

[30] Foreign Application Priority Data

May 12, 1993 [JP] Japan .................................. 5-110288
Dec. 10, 1993 [JP] Japan .................................. 5-310193

[51] Int. Cl.$^6$ .......................... H02H 3/087; H02H 3/10
[52] U.S. Cl. ............................ 307/10.1; 307/9.1; 307/18;
307/132 E; 361/23; 361/30; 361/102; 361/187;
180/65.1; 180/65.8
[58] Field of Search .................................. 361/23, 24, 31,
361/42, 187, 210, 93, 102; 307/9.1, 10.1,
10.7, 44, 45, 46, 64, 66, 116, 130, 131,
132 R, 132 E, 139, 140, 142, 143, 24;
180/65.1, 65.8; 335/256; 340/648; 324/424

[56] References Cited

U.S. PATENT DOCUMENTS

| | | | |
|---|---|---|---|
| 3,581,179 | 5/1971 | Jones ........................................... | 361/31 |
| 3,818,272 | 6/1974 | Rich ............................................ | 307/66 |
| 4,138,706 | 2/1979 | Johnson et al. ............................ | 361/42 |
| 4,214,289 | 7/1980 | Otsuka ........................................ | 361/20 |
| 4,663,537 | 5/1987 | Göldner et al. .......................... | 307/10.1 |
| 4,933,799 | 6/1990 | Lai ............................................. | 361/102 |
| 5,001,623 | 3/1991 | Magid ........................................ | 307/66 |
| 5,191,500 | 3/1993 | Hatano et al. ............................ | 307/10.1 |

Primary Examiner—William M. Shoop, Jr.
Assistant Examiner—Peter Ganjoo
Attorney, Agent, or Firm—Lyon & Lyon

[57] ABSTRACT

A circuit breaker device for use on an electric vehicle has a high-voltage drive power supply for supplying electric energy to a load to drive the electric vehicle, a circuit breaker for cutting off the electric energy supplied from the drive power supply to the load, a sensor assembly for detecting conditions of the electric vehicle, and a controller for controlling operation of the circuit breaker in response to a detected signal from the sensor assembly. The controller is connected to a low-voltage accessory power supply for energizing accessories on the electric vehicle, and also connected to the drive power supply through a power supply converter for converting the electric energy supplied from the drive power supply, so that the controller can be energized at all times by at least one of either the accessory power supply or the drive power supply. The circuit breaker has first and second shunt coils energizable for cutting off the output of the electric energy from the drive power supply and the accessory power supply, the first shunt coil being connected to the drive power supply and the second shunt coil being connected to the accessory power supply.

18 Claims, 6 Drawing Sheets

CIRCUIT BREAKER DEVICE FOR ELECTRIC VEHICLE

BACKGROUND OF THE INVENTION

1. Field of the Invention

The present invention relates to a circuit breaker device for cutting off the output of electric energy from a battery power supply on an electric vehicle, and more particularly to a circuit breaker device which can be operated highly reliably for cutting off the output of electric energy from a battery power supply on an electric vehicle.

2. Description of the Prior Art

Japanese Laid-Open Patent Publication No. 53-140551 discloses a conventional circuit breaker device having a breaker including a single shunt coil connected to a power supply. Depending on signals from various sensors connected to the circuit breaker device, a current flows through the shunt coil to open breaker contacts to which the power supply and circuits are connected, for thereby turning off the power supply and disconnecting the circuits to protect the circuits.

The conventional circuit breaker device is arranged to operate in response to the signal from any one of the sensors.

Since the conventional circuit breaker device has only one shunt coil and one power supply is connected to the shunt coil, it may be possible, upon a voltage drop of the power supply, for the circuit breaker device to fail to be tripped and hence to fail to turn off the power supply even when a current flows through the shunt coil based on the signal from any one of the sensors.

Electric vehicles generally have batteries as a power source which includes a drive power supply for applying a high voltage ranging from 150 V to 300 V to energize a motor and an accessory power supply for applying a low voltage of 12 V to energize accessories and a controller of the circuit breaker device. These power supplies are highly likely to experience a voltage drop quickly due to rapid energy consumption from the batteries. In particular, the voltage of the accessory power supply suffers a voltage drop more often than the drive power supply when the driver of the electric vehicle forgets to turn off the head lamps.

In the case where only the accessory power supply is connected to the shunt coil of the circuit breaker device for supplying a current therefrom to the shunt coil to open the contact of the circuit breaker device based on a sensor coil, the circuit breaker device may not be tripped in the event of a voltage drop of the accessory power supply.

Inasmuch as the controller of the circuit breaker device is energized by the accessory power supply, the controller may not operate properly owing to a voltage drop of the accessory power supply when the stored electric energy is excessively consumed. It is therefore desirable in an electric vehicle having a high-voltage power supply for applying a high voltage ranging from 150 V to 300 V to be able to monitor the operation of the electric vehicle and also monitor the condition of the high-voltage power supply until its voltage drops to a level which is too low for the high-voltage power supply to function properly.

SUMMARY OF THE INVENTION

It is therefore an object of the present invention to provide a circuit breaker device which has a power supply system capable of enabling shunt coils and a breaker controller to operate normally upon a voltage drop of a low-voltage power supply on an electric vehicle, so that the circuit breaker device can operate reliably unless a high voltage power supply also fails to operate.

According to the present invention, there is provided a circuit breaker device for use on an electric vehicle, comprising a high-voltage drive power supply for supplying electric energy to a load to drive the electric vehicle, a circuit breaker for cutting off the electric energy supplied from the drive power supply to the load, sensor means for detecting conditions of the electric vehicle, control means for controlling operation of the circuit breaker in response to a detected signal from the a sensor means, a low-voltage accessory power supply for energizing accessories on the electric vehicle, and power supply converting means for converting the electric energy supplied from the drive power supply, the control means being connected to the accessory power supply and also connected to the drive power supply through the power supply converting means, whereby the control means can be energized at all times by at least one of either the accessory power supply or the drive power supply.

According to the present invention, there is also provided a circuit breaker device for use on an electric vehicle, comprising a high-voltage drive power supply for supplying electric energy to a load to drive the electric vehicle, a circuit breaker having first and second shunt coils for cutting off the electric energy supplied from the drive power supply to the load, sensor means for detecting conditions of the electric vehicle, control means for controlling operation of the circuit breaker in response to a detected signal from the sensor means, and a low-voltage accessory power supply or energizing accessories on the electric vehicle, the first shunt coil being connected to the drive power supply, and the second shunt coil being connected to the accessory power supply.

The circuit breaker device has two shunt coils connected respectively to the drive power supply and the accessory power supply so that the shunt coils can be energized respectively by the drive power supply and the accessory power supply. Therefore, the circuit breaker device can be operated at all times as long as at least the high-voltage drive power supply, which can be turned off by the circuit breaker device, operates normally.

The control means is energizable selectively by the accessory power supply and by the drive power supply through a power supply converter. Consequently, as long as at least the high-voltage drive power supply operates normally, the control means can be operated to energize the shunt coils. The circuit breaker device can monitor the conditions of the electric vehicle at all times, and can be operated to turn off the drive power supply in the event of a malfunction of the drive power supply.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
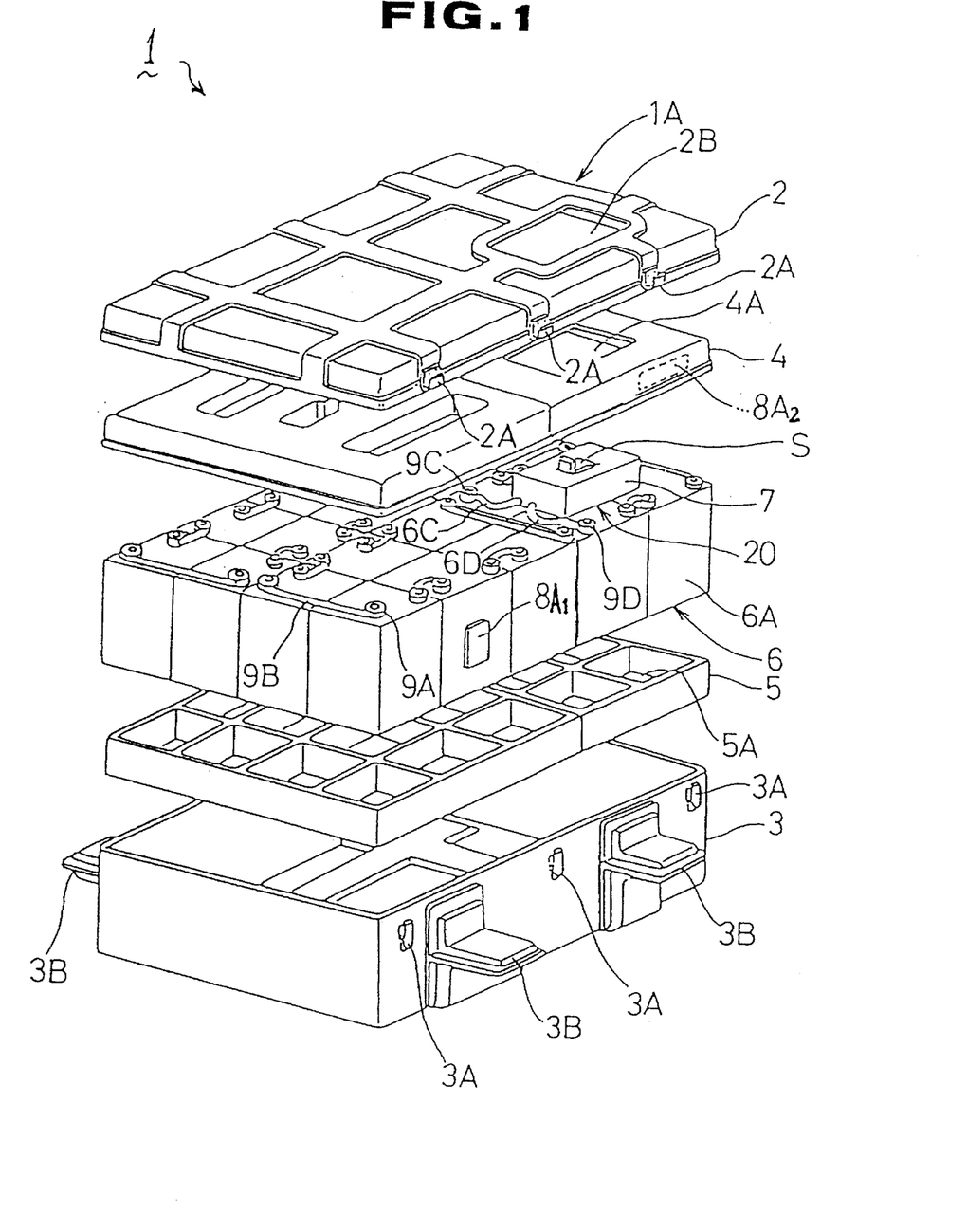
FIG. 1 is an exploded perspective view of a battery box device for use on an electric vehicle according to an embodiment of the present invention.
Figure 5:
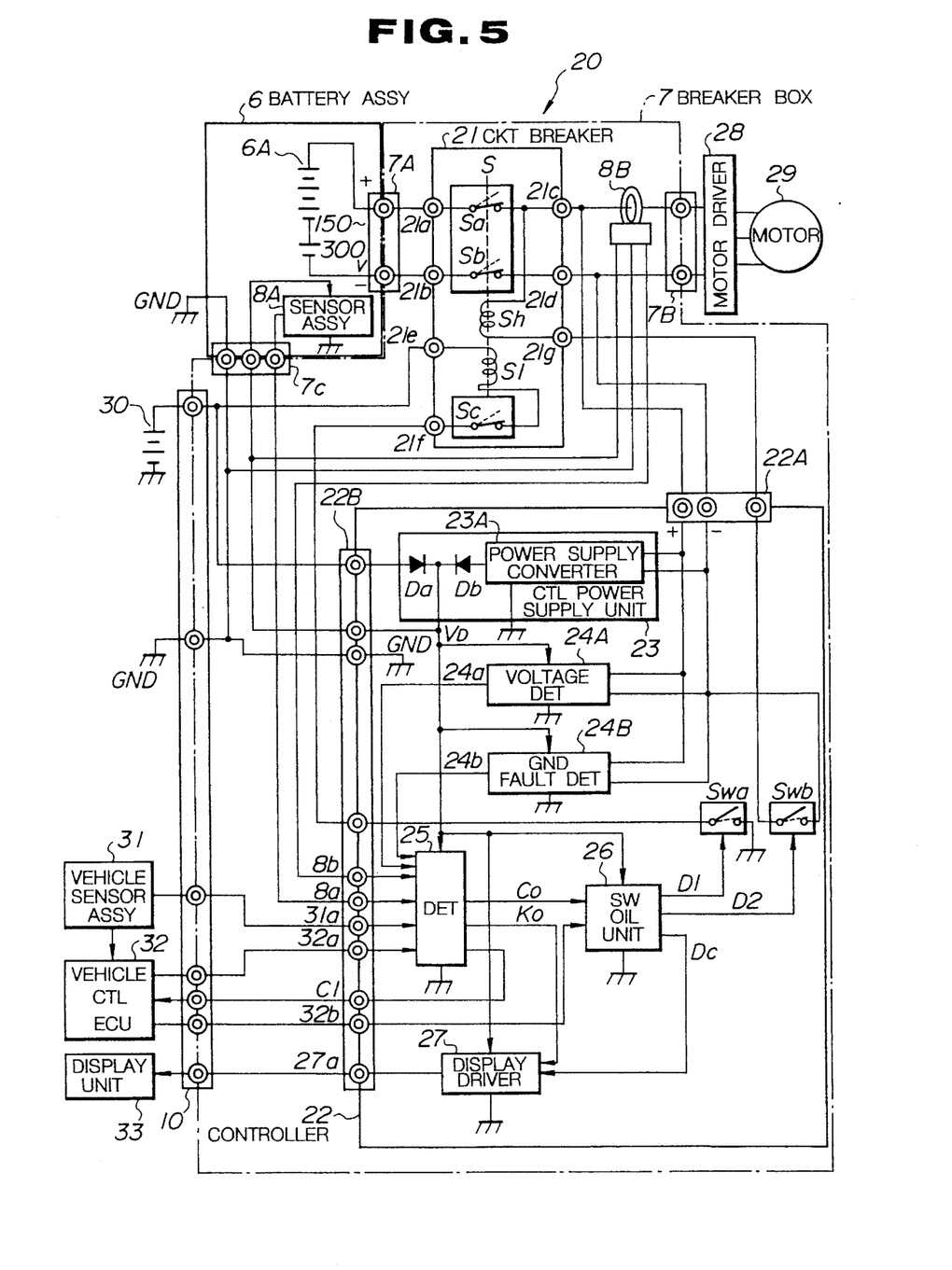
FIG. 5 is a block diagram of the circuit breaker device.

As shown in FIG. 1, a battery box device 1 for use on an electric vehicle according to the present invention includes a circuit breaker device 20 having a breaker box 7 which houses, as shown in FIG. 5 a circuit breaker 21, a controller 22, a current sensor 8B, an input connector 7A, an output connector 7B, an input connector 7C, and an external interface (I/F) connector 10. The battery box device 1 also includes a battery assembly 6 having a high-voltage drive power supply 6A as a battery composed of a plurality of series-connected storage batteries and a sensor assembly 8A. The circuit breaker device 20 and the battery assembly 6 are separate from each other as different functional blocks, but are substantially integrated by or housed in a battery box 1A.

The battery box 1A comprises a pair of upper and lower cases 2, 3 of steel and a pair of upper and lower battery covers 4, 5 of synthetic resin. The sensor assembly 8A comprises a plurality of sensors including a sensor $8A_1$ for detecting the temperature of the drive power supply 6A and a gas sensor $8A_2$ for detecting hydrogen gas.

Figure 2A:
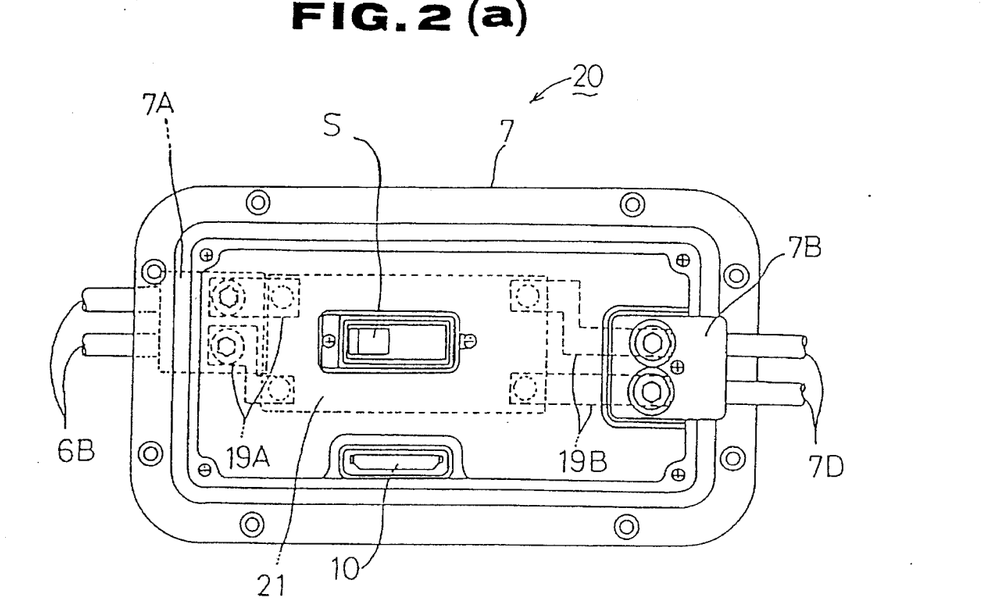
FIG. 2(a) is a plan view of a circuit breaker device in the battery box device.
Figure 2B:
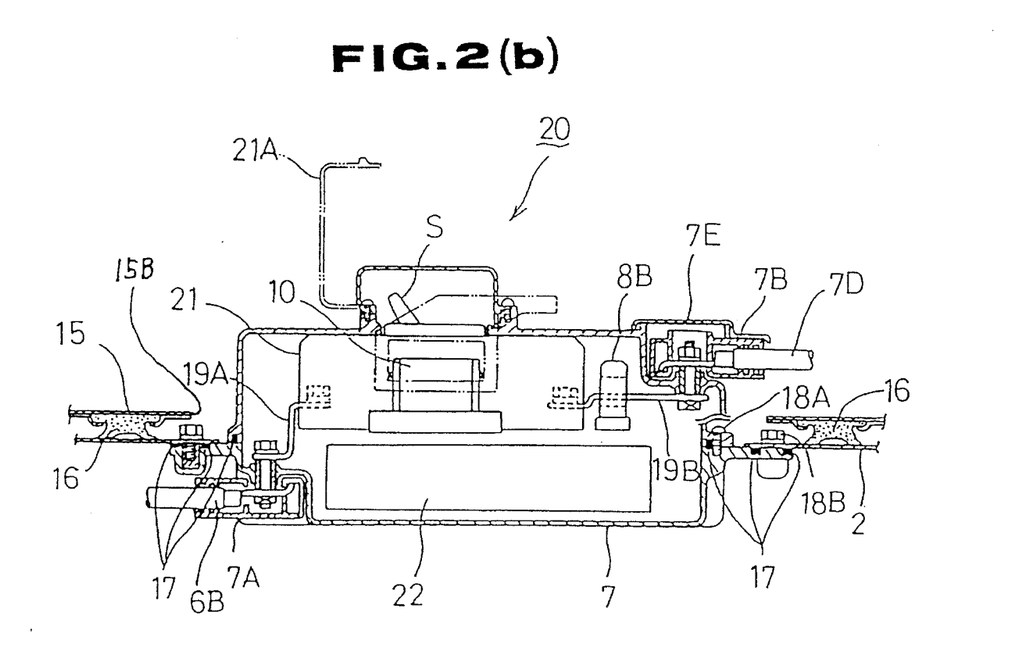
FIG. 2(b) is a vertical cross-sectional view of the circuit breaker device shown in FIG. 2(a)
Figure 3A:
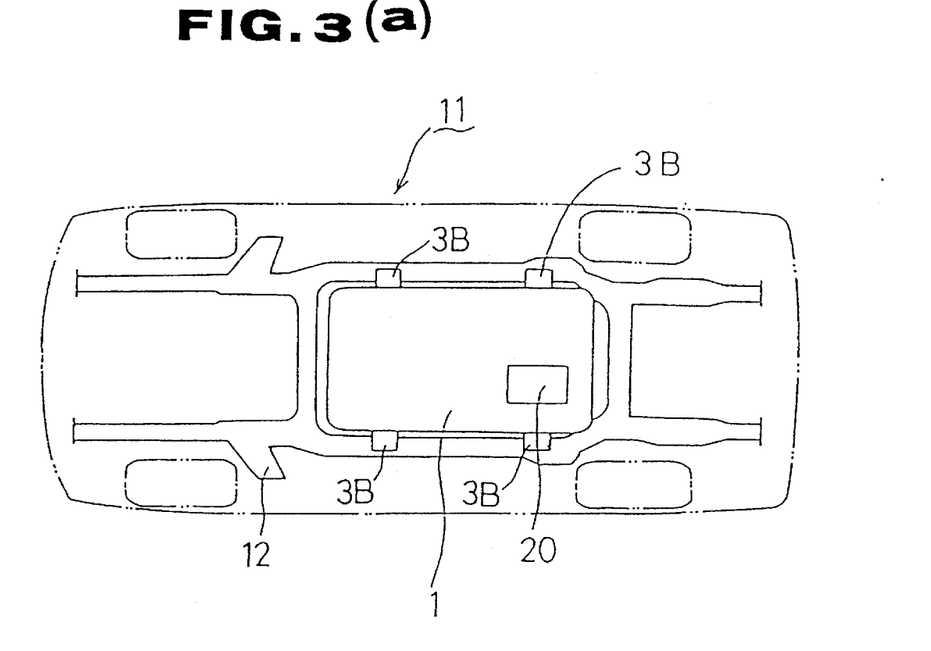
FIG. 3(a) is a schematic plan view of an electric vehicle which incorporates the battery box device according to the present invention.
Figure 3B:
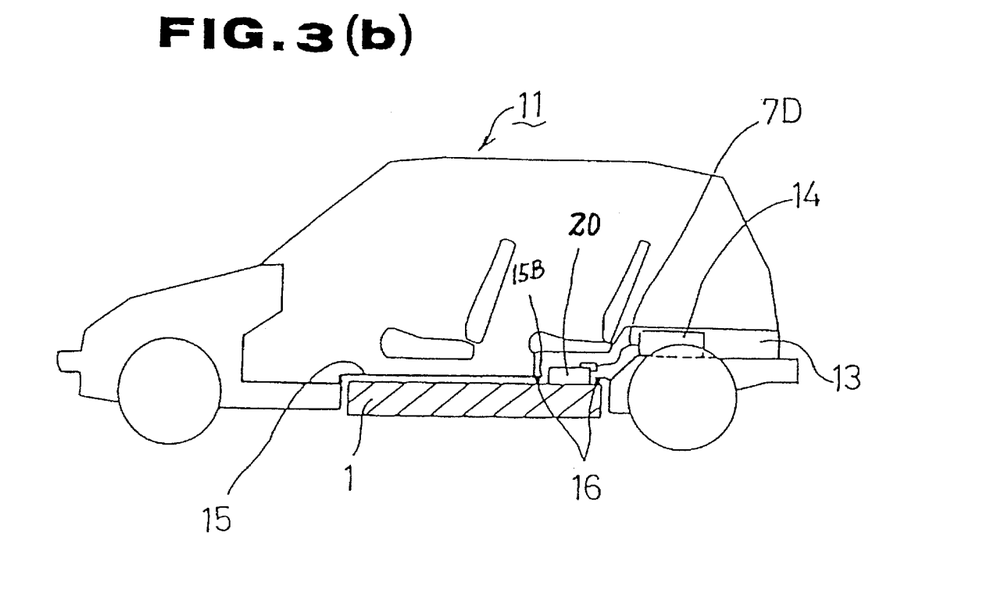
FIG. 3(b) is a side elevational view of the electric vehicle shown in FIG. 3(a)

In use, the battery box device 1 with the battery assembly 6 housed in the battery box 1A and with the circuit breaker device 20 partly housed in the battery box 1A or integrally coupled to the battery assembly 6 is fixedly mounted on the bottom panel 15 (see FIG. 3(b)) of the vehicle body of an electric vehicle 11. Therefore, the battery box device 1 is required to be protected against vibrations of the electric vehicle and water splashes from the road. To meet such requirements, the battery box device 1 is constructed for sufficient mechanical strength and is a hermetically sealed structure. For example, the upper case 2 has a plurality of hooks 2A on its outer side edges, and the lower case 3 has a plurality of locks 3A on its outer side panels in alignment with the hooks 2A, respectively. These hooks 2A and locks 3A are releasably coupled to each other to fix the upper and lower cases 2, 3 together in alignment with each other, thus making up the battery box 1A. As shown in FIG. 2(b), the circuit breaker device 20 is fixedly joined to the battery box 1A by screws 18B which interconnect the breaker box 7 and the upper case 2.

The upper case 2 has an open window 2B defined therein. The circuit breaker device 20 may be disposed partly or entirely out of the upper case 2 through the open case window 2B, or preferably projects out of the upper case 2 through the open case window 2B, so that a breaker switch S of the circuit breaker device 20 can manually be operated and connectors or terminals of the circuit breaker device 20 can be connected to an outer circuit or the like after the battery box device 1 has been assembled or installed on the bottom panel 15 of the electric vehicle body. At least the breaker switch S and some of the connectors or terminals are exposed to the outside of the breaker box 7 as shown in FIGS. 1, 2(a), and 2(b). Preferably, the breaker switch S projects from an upper surface of the breaker box 7, and some of the connectors or terminals are exposed to the outside of the upper surface of the breaker box 7.

The lower case 3 has a plurality of (four in the illustrated embodiment) attachment arms 3B on its outer side panels. For installation, the battery box device 1 is positioned immediately below the bottom panel 15 (see FIG. 3(b)) of the electric vehicle body, and fixedly supported on a frame 12 (see FIG. 3(a)) of the electric vehicle body by the attachment arms 3B.

The upper and lower battery covers 4, 5 of the battery box 1A cooperate with the upper and lower cases 2, 3 in vertically accommodating and supporting the drive power supply 6A, the sensor assembly 8A, and the circuit breaker device 20, and protecting them by absorbing vibrations of the electric vehicle.

The lower cover 5 has a plurality of battery storage chambers or compartments 5A for housing the respective storage batteries therein. The cell storage chambers 5A allow the storage batteries to be easily positioned therein and interconnected by cables. In addition, the battery storage chambers 5A permit the storage batteries to be simultaneously and neatly placed in the battery box 1A while leaving spaces around the respective storage batteries for dissipating the heat produced by the storage batteries.

The upper cover 4 has an open cover window 4A defined therein in registry with the open case window 2B so that the circuit breaker device 20 can project partly or entirely through the open case window 2B. The sensor $8A_2$, for example, of the sensor assembly 8A is mounted in the upper cover 4 for monitoring any hydrogen gas which may be generated when the drive power supply 6A is overcharged. The sensor assembly 8A and the circuit breaker device 20 are electrically connected to each other, as shown in FIG. 5, for supplying sensor signals from the sensor assembly 8A to the circuit breaker device 20.

The drive power supply 6A comprises a plurality of chargeable lead storage batteries, for example, which are connected in series with each other by connector cables 9B connected to terminals 9A of the storage batteries. The drive power supply 6A with the storage batteries thus connected produce any desired output voltage preferably ranging from 150 V to 300 V, for example. The storage batteries at the opposite ends of the series-connected array of storage batteries having end terminals 9C, 9D, respectively, which are connected to the circuit breaker device 20 through respective connector cables 6C, 6D for thereby supplying the battery output voltage to the circuit breaker device 20. Specifically, as shown in FIGS. 2(a) and 2(b), the connector cables 6C, 6D are connected as input cables 6B to the input connector 7A of the circuit breaker device 20.

The temperature sensor $8A_1$, for example, of the sensor assembly 8A is mounted on the drive power supply 6A for detecting the temperature of the storage batteries. Detected signals from the temperature sensor $8A^1$ and the gas sensor $8A_2$ are supplied through the input connector 7C (see FIG. 5) to the circuit breaker device 20.

The voltage of the drive power supply 6A alone can be checked through the connector cables 6C, 6D or the input connector 7A after the battery assembly 6 has been assembled and wired.

As described above, the circuit breaker device 20 which comprises the circuit breaker 21, the controller 22, and the other components constitutes a functional block, and is disposed in an upper portion of the battery box device 1 with the manual breaker switch S on its upper surface. In particular, the circuit breaker device 20 projects partly or entirely from the case window 2B so as to be positioned substantially outside of the upper case 2.

The present invention is, however, not limited to the above embodiment with respect to the integral arrangement of the battery box 1A and the circuit breaker device 20. The circuit breaker device 20 may first be electrically connected to the drive power supply 6A housed in the battery box 1A, and then the breaker box 7 may be mechanically coupled to the battery box 1A in the case window 2B. The case window 2B may be defined as an insertion hole for inserting the input cables 6B, and the breaker box 7 may be placed on the upper surface of the battery box 1A.

When the circuit breaker device 20 is turned on by manually operating the breaker switch S, the battery box device 1 can supply an electric energy generated by the drive power supply 6A to an external load such as a motor driver 28 as shown in FIG. 5. When the circuit breaker device 20 is turned off by manually operating the breaker switch S, the battery box device 1 can shut-off the outputting of the electric energy, so that the battery box device 1 can easily be handled when it is installed on the electric vehicle or serviced for maintenance.

As shown in FIGS. 2(a) and 2(b), the circuit breaker 21, the controller 22, the current sensor 8B, the input connector 7A, the output connector 7B, and the I/F connector 10 are housed in the breaker box 7, and the manual breaker switch S projecting upwardly from the breaker box 7 is openably covered with a switch protection cover 21A hinged to the breaker box 7. The output connector 7B is positioned in an upper portion of the circuit breaker device 20, and the input connector 7A is positioned in a lower portion of the circuit breaker device 20. The input cables 6B from the drive power supply 6A are connected to the input connector 7A, and output cables 7D from an external load, e.g., the motor driver 28 shown in FIG. 5, are connected to the output connector 7B.

The output voltage which may range from 150 V to 300 V) from the drive power supply 6A is supplied through the input cables 6B, the input connector 7A, and an input bus bar 19A to the circuit breaker 21, from which it is supplied through an output bus bar 19B, the output connector 7B, and the output cables 7D to the motor driver 28. The current sensor 8B for monitoring an output current of the circuit breaker 21 is attached to the output bus bar 19B. When an excessive current flows through the output bus bar 19B, it is detected by the current sensor 8B, and the controller 22 operates the circuit breaker 21 to turn-off the drive power supply 6A.

In this embodiment, the input cables 6B from the drive power supply 6A and the input connector 7A are connected to each other at the time when the battery box device 1 is assembled, and cannot be accessed from the exterior after assembled. However, the present invention is not limited to such a structure.

The I/F connector 10, which is accessible from the exterior, is mounted and exposed on an upper portion of the breaker box 7 for easy connection to a dummy circuit (not shown) for operating the circuit breaker 21 or an external maintenance test device (not shown) for diagnosing the circuit breaker 21, so that the circuit breaker device 20 can be checked alone. The I/V connector 10 also allows the circuit breaker device 20 to be easily connected to functional blocks on the electric vehicle, e.g., a vehicle control electronic control unit (ECU) 32, a vehicle sensor assembly 341, a display unit 33, and an accessory power supply 30 for supplying a voltage of 12 V, as shown in FIG. 5.

The input connector 7A and the output connector 7B shown in FIGS. 2(a) and 2(b) are disposed and exposed out of the breaker box 7. The input cables 6B (6C, 6D) for carrying the electric power from the driver power supply 6A are connected to the input connector 7A, and the output cables 7D from the motor driver 28 for energizing a motor 29 see FIG. 5) on the electric motor are connected to the output connector 7B. the output connector 7B is covered with a protective connector cover 7E.

since the circuit breaker device 20 is electrically connected to the batteries and the external circuits through the connectors 7A, 7B, 7C, the circuit breaker device 20 can efficiently be assembled and serviced.

The breaker switch S and the connector cover 7E may be interlinked by a link mechanism or the like (not shown) such that the output connector 7B can be covered with the connector cover 7E when the breaker switch S is turned on, and the connector cover 7E can be moved to open the output connector 7B only when the breaker switch S is turned off, i.e., when the drive power supply 6A is cut-off. With such modified arrangement, the drive power supply 6A is cut-off for safe operation insofar as the connector cover 7E is removed for connecting the output cables 7D to the output connector 7B and serving the output connector 7B.

The switch protection cover 21A is positioned so as to project out of the upper case 2 through the cover window 4A and the case window 2B/. Consequently, the switch protection cover 21A can manually be opened from outside of the upper case 2, and the breaker switch S can manually be operated. When the switch protection cover 21A is opened and the breaker switch S is turned on, therefore, the battery box device 1 alone can be operated and checked for its performance.

When the breaker switch S is turned off and the switch protection cover 21A is closed, the drive power supply 6A is turned off. In this manner, the drive power supply 6A can remain turned off while the battery box device 1 is being installed on the electric vehicle or dismounted for maintenance.

As shown in FIG. 2(b), the breaker box 7 has upper and lower mating surfaces fastened to each other by screws 18A. The screws 18A, 18B are tightened on the breaker box 7 and the upper case 2 through seal gaskets 17 which make the circuit breaker device 20 and the battery box device 1 hermetically sealed.

The functional blocks of the battery box device 1, i.e., the circuit breaker device 20 and the battery assembly 6, are housed in or integrated by the battery box 1A. Consequently, the battery box device 1 is of a relatively simple construction with only the breaker switch S, the output connector 7B, and the I/F connector 10 being exposed outside of the breaker box 7.

Inasmuch as the breaker switch S, the output connector 7B, and the I/F connector 10 are disposed outside or upwardly of the upper case 2 and the bottom panel 15 of the vehicle body, the breaker switch S can easily be operated and the output connector 7B and the I/F connector 10 can easily be connected to and disconnect from external connectors.

When the battery box device 1 is installed on the electric vehicle, the breaker switch S, the output connector 7B, and the I/F connector 10 are located within a passenger's compartment of the electric vehicle. Consequently, after the battery box device 1 has been installed on the electric vehicle, the breaker switch S can be operated and the output connector 7B and the I/F connector 10 can be connected within the passenger's compartment, and the breaker switch S, the output connector 7B, and the I/F connector 10 can be serviced for maintenance within the passenger's compartment.

A dummy power supply or load, or a simple test instrument may be connected to the breaker switch S, the input connector 7A, the output connector 7B, and the I/F connector 10 for checking the circuit breaker device 20 for its operation and confirming its performance. Therefore, before the circuit breaker device 20 is assembled in the battery box device 1, the circuit breaker device 20 alone may be checked and guaranteed the performance.

The battery box device 1 is installed on an electric vehicle 11 as shown in FIGS. 3(a) and 3(b), the battery box device 1 is mounted on the bottom panel 15 of the electric vehicle 11.

In FIGS. 3(a) and 3(b), the battery box device 1 is shown as being fixedly mounted on the frame 12 on the bottom panel 15 of the electric vehicle 11 through the attachment arms 3B of the lower case 3.

With the battery box device 1 installed on the electric vehicle 11, the circuit breaker device 20 which projects upwardly out of the battery box 1A through the case window 2B also projects upwardly into the passenger's compartment of the electric vehicle 11 through an opening 15B that is defined in the bottom panel 15, as shown in FIGS. 2(b) and 3(b).

In FIG. 3(b), the battery box device 1 is shown as being positioned underneath the front and rear seats in the electric vehicle 11 with the circuit breaker positioned beneath the rear seat. Since the circuit breaker device 20 projects upwardly into the passenger's compartment, the breaker switch S and the I/F connector 10 are exposed in the passenger's compartment. Therefore, the breaker switch S can be operated in the passenger's compartment to actuate the circuit breaker 21. The circuit breaker device 20 may project into the passenger's compartment underneath the front seats in the electric vehicle 11, or anywhere in the passenger's compartment depending on the location of the load, i.e., the motor 29.

Since the I/F connector 10 is also exposed in the passenger's compartment, the vehicle sensor assembly 31, the vehicle control ECU 32, the display unit 33, and the accessory power supply 30 can be connected to the circuit breaker device 20 in the passenger's compartment.

The battery box device 1 is attached to the bottom panel 15 through a water-resistant seal 16 (see FIGS. 2(b) and 3(b)) which is sealingly interposed between the upper case 2 and the bottom panel 15 and extends around the opening 15B. Therefore, any water or dust particles are prevented from entering through the opening 15B into the passenger's compartment.

The input cables 6B and the input connector 7A are sealed in the battery box device 1, and connected to the circuit breaker device 20 underneath the bottom panel 15. The output connector 7B and the output cables 7D are positioned above the bottom panel 15, and sealed from the exterior by the water-resistant seal 16.

Figure 4:
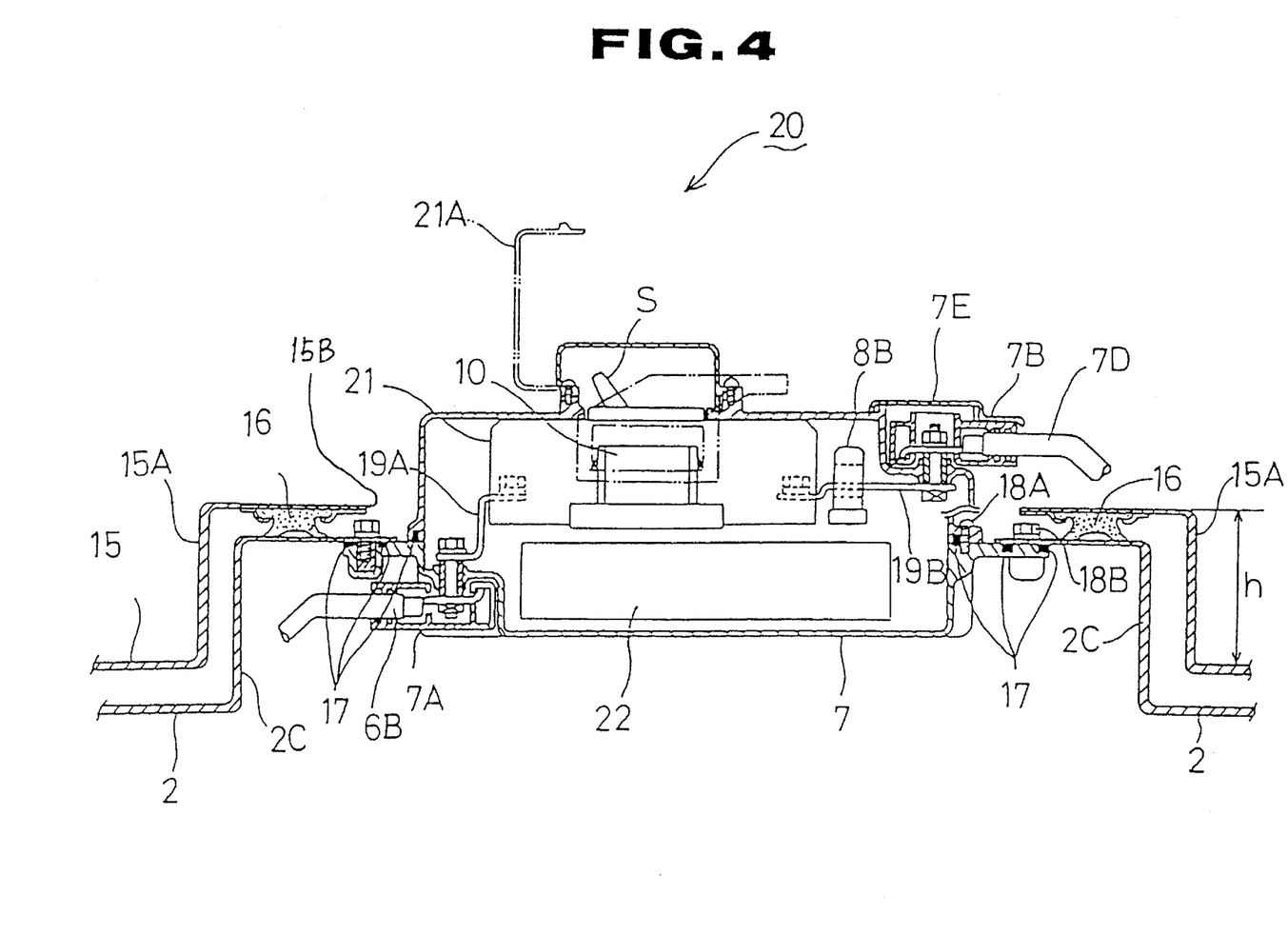
FIG. 4 is a vertical cross-sectional view of a portion of a battery box device according to another embodiment of the present invention.

FIG. 4 shows a battery box device according to another embodiment of the present invention.

The battery box device shown in FIG. 4 differs from the battery box device shown in FIG. 2(b) in that the circuit breaker device 20 is fixedly mounted on an upwardly projecting mount 2C of the upper case 2, the output cables 7D from the circuit breaker device 20 are bent downwardly from the output connector 7B toward the bottom panel 15, and the bottom panel 15 of the electric vehicle has an upwardly projecting base 15A in which the upwardly projecting mount 2C is complementarily housed. The other details of the battery box device shown in FIGS. 4 are the same as those of the battery box device shown in FIGS. 2(b).

The battery box device shown in FIG. 4 offers the following advantages:

Since the output cables 7D are bent downwardly, any water flowing along the output cables 7D is prevented from entering the output connector 7B.

The breaker switch S, the output connector 7B, and the I/F connector 10 of the circuit breaker device 20 are higher than the bottom panel 15 by a distance of at least h. Therefore, even when water enters through the bottom panel 15 into the passenger's compartment past the water-resistance seal 16 and the seal gaskets 17 for some reason, the water is prevented from being applied to the breaker switch S, the output connector 7B, and the I/F connector 10.

Now, an electric circuit arrangement of the circuit breaker device 20 will be described below.

FIG. 5 shows in block form the electric circuit arrangement of the circuit breaker device 20. As shown in FIG. 5, the circuit breaker device 20 includes the circuit breaker 21 with the manual breaker switch S, the controller 22, and the current sensor 8B which are disposed in the breaker box 7, and also has the input connector 7A, the output connector 7B, the input connector 7C, and the I/F connector 10 which are mounted on outer panel surfaces of the breaker box 7. These connectors are electrically connected to the circuit breaker 21 with the manual breaker switch S, the controller 22, and the current sensor 8B as shown.

In FIG. 5, the battery assembly 6 includes the drive power supply 6A which generates a high voltage ranging from 150 V to 300 V for energizing the motor 29 and which is electrically connected to the circuit breaker device 20 through the input connector 7A, and the sensor assembly 8A which is electrically connected to the circuit breaker device 20 through the input connector 7C.

The battery assembly 6 and the circuit breaker device 20 are integrally coupled to each other into the battery box device 1. The drive power supply 6A can be charged and the circuit breaker 21 can be checked for its operation and serviced for maintenance while mounted in the battery box device 1.

The motor driver 28 is electrically connected to the circuit breaker device 20 through the output connector 7B and terminals 21c, 21d, for energizing the motor 29 with the high voltage supplied from the driver power supply 6A through the output connector 7B. The accessory power supply 30, the vehicle sensor assembly 31, the vehicle control ECU 32, the display unit 33 are electrically connected to the circuit breaker device 20 through the I/F connector 10. The electrical ground of the electric vehicle 11 is connected to the electrical ground of the circuit breaker device 20 also through the I/F connector 10, as shown by the electrical ground symbols (unnumbered).

The accessory power supply 30 also comprises one or a plurality of chargeable storage batteries, and serves as a low-voltage power supply for energizing accessories and head lamps on the electric vehicle, and also a supply of electric energy to the circuit breaker device 20 to energize the controller 22 and the circuit breaker 21.

The drive power supply 6A has two power lines connected through the input connector 7A to terminals 21a, 21b, respectively, of the circuit breaker 21. The drive power supply 6A is removably supported on the electric vehicle body. The sensor assembly 8A has a sensor signal line connected through the input connector 7C to a connector 22B of the controller 22.

The accessory power supply 30 has a negative terminal grounded and a positive terminal connected through the I/F connector 10 to the connector 22B of the controller 22. The accessory power supply 30, which is shown as being external to the battery assembly 6, may be included in the battery assembly 6.

The circuit breaker 21 comprises a shunt coil Sh, a shunt coil Sl, a contact Sa, a contact Sb, a contact Sc, and the manual breaker switch S.

Each of the contacts Sa, Sb, Sc comprises a normally closed (normally-on) switch. When a current flows through either one of the shunt coils Sh, Sl, all of the contacts Sa, Sb, Sc are turned off, turning off the breaker switch S. The contacts Sa, Sb, Sc can also be turned on and off by manually operating the breaker switch S.

The shunt coil Sh has a terminal connected through the contact Sa and the terminal 21a to the positive terminal of the drive power supply 6A, and has the other terminal connected through a terminal 21g and a connector 22A to a switch Swb of the controller 22. The switch Swb is connected through the connector 22A, the terminal 21d, the contact Sb, and the terminal 21b to the negative terminal of the drive power supply 6A.

The shunt coil Sl has a terminal connected through a terminal 21e and the I/F connector 10 to the positive terminal of the accessory power supply 30, and the other terminal connected through the contact Sc, a terminal 21f, and the connector 22B to a grounded switch Swa of the controller 22.

Therefore, when the switch Swb or Swa is turned on to supply a current to either one of the shunt coils Sh, Sl, the circuit breaker 21 is actuated to turn off the contacts Sa, Sb, thus cutting off the electric energy from the drive power supply 6A.

The controller 22 comprises a controller power supply unit 23, a voltage detector 24A, a ground-fault detector 24B, a detector 25, a switch control unit 26, the switches Swa, Swb, and a display driver 27.

The control power supply unit 23 comprises a power supply converter 23A and a pair of diodes Da, Db. The control power supply unit 23 supplies either an electric energy having a voltage of 12 V which has been converted from the electric energy supplied from the drive power supply 6A through the connector 22A, or the electric energy having a voltage of 12 V supplied from the accessory power supply 30 through the connector 22B, as a control voltage $V_D$ of 12 V, to the voltage detector 24A, the ground fault detector 24B, the detector 25, the switch control unit 26, the display driver 27, and the sensor assembly 8A.

The power supply converter 23A is composed of an electronic device such as a DC/DC converters or the like for lowering a DC voltage, i.e., the voltage (150 V~300 V) of the driver power supply 6A to the control voltage $V_D$ (12 V), which is supplied through the diode Db.

Since the power supply converter 23A is contained in the controller 22 to minimize the wiring of the high-voltage power supply system, it can be assembled and serviced highly efficiently, and can also be constructed of a relatively few number of parts.

The voltage from the accessory power supply 30 is supplied as the control voltage $V_D$ through the diode Da.

When the voltage supplied from the accessory power supply 30 through the diode Da drops from 12 V to a level below a predetermined value, the power supply converter 23A is energized regardless of whether the electric vehicle is running or at rest, thus supplying the control voltage $V_D$ through the diode Db.

When the voltage supplied from the accessory power supply 30 through the diode Da remains in an acceptable predetermined range, the power supply converter 23A is disabled into a standby condition. Therefore, the power supply converter 23A can have a longer service life and consume a reduced amount of electric energy.

The diodes Da, Db are connected in reverse with each other for preventing a current from flowing back to the power supply converter 23A and the accessory power supply 30.

The voltage detector 24A and the ground-fault detector 24B are energized by the control voltage $V_D$ for monitoring the voltage supplied from the drive power supply 6A through the connector 22A. When the voltage detector 24A or the ground-fault detector 24B detect an abnormal voltage or a ground fault, respectively, of the drive power supply 6A, they transmit respective detected signals to the detector 25. More specifically, the voltage detector 24A, which may comprise a voltage detecting unit, for example, outputs a voltage detected signal when the voltage of the drive power supply 6A becomes higher or lower than a predetermined value. The ground-fault detector 24B, which may comprise an isolated photocoupler or the like, outputs a ground-fault detected signal when the output from the photocoupler drops to a zero level.

The detector 25 is supplied with detected signals 8a from the sensor assembly 8A, a current detected signal 8b from the current sensor 8B, a voltage detected signal 24a from the voltage detector 24A, a ground-fault detected signal 24b from the ground-fault detector 25B, various sensor signals 31a from the vehicle sensor assembly 31, and a test or dummy signal 32a supplied from the vehicle control ECU 32 for confirming the operation of the controller 22, or a composite control signal 32a generated by the vehicle control ECUI 32 based on processing of various sensor signals 31a from the vehicle sensor assembly 31. In response to these supplied signals, the detector 25 generates and supplies a switch control signal Co to the switch control unit 26.

The control signals 32a and a control signal C1 are transmitted between the vehicle control ECU 32 and the detector 25 for monitoring the vehicle control ECU 32 and the detector 25 to determine whether they operate normally or not.

Based on the various sensor signals 31a from the vehicle sensor assembly 31, the detector 25 supplies the control signal C1 to the vehicle control ECU 32, and also supplies a display control signal Ko to the display driver 27 for displaying any malfunction detected by the vehicle sensor assembly 31 on the display unit 33.

In response to the switch control signal Co from the detector 25 and a switch control signal 32b from the vehicle control ECU 32, the switch control unit 26 sends drive signals D1, D2, respectively, to the switches Swa, Swb to turn on the switches Swa, Swb for thereby energizing the shunt coils Sh, Sl to actuate the circuit breaker 21 to turn off the contacts Sa~Sc, thus cutting off the electric energy from the drive power supply 6A. each of the switches Swa, Swb comprises an electronic switch or the like.

The switch control unit 26 also supplies a display control signal Dc corresponding to the switch control signal Co or the switch control signal 32b to the display driver 27.

The display driver 27 generates a display drive signal 27a indicative of information about vehicle conditions stored in a ROM or the like, based on the display control signal Ko from the detector 25 and the display control signal Dc from the switch control until 26. The display driver 27 sends the generated display driver signal 27a to the display unit 33, which may be mounted on a front instrument panel of the electric vehicle, for displaying malfunctions as detected by the sensors assembly 8A, the current sensor 8B, the voltage detector 24A, the ground-fault detector 24B, and the vehicle sensor assembly 31.

Figure 6:
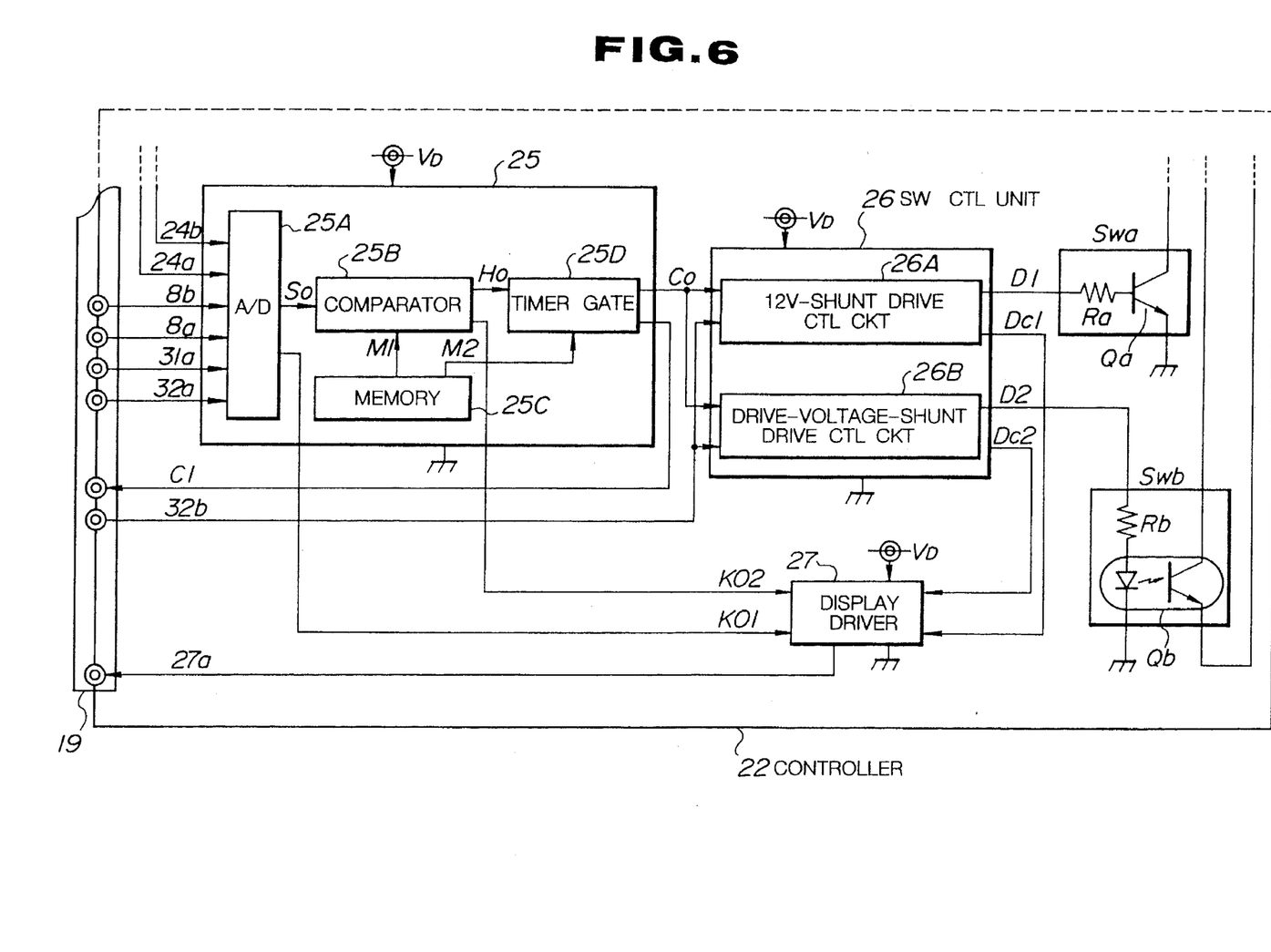
FIG. 6 is a block diagram of a detector and a switch control unit of a controller in the circuit breaker device.

The detector 25 and the switch control unit 26 are shown in greater detail in FIG. 6.

As shown in FIG. 6, the detector 25 comprises an analog-to-digital (A/D) converter 25A for converting each f various analog sensor signals into a digital sensor signal So, a memory 25C such as a ROM or the like for storing a sensor reference value M1 and a timer reference value M2, a comparator 25B for comparing the digital sensor signal So from the A/D converter 25A with the sensor reference value M1 read from the memory 25C and outputting a compared signal Ho, and a timer gate 25D for comparing a continuation time $T_H$ for which the compared signal Ho continues with the timer reference value M2 from the memory 25C and outputting the switch control signal Co and the control signal C1.

The A/D converter 25A is supplied with the sensor signals 8, e.g., a temperature signal, a gas signal, an acceleration (G) signal, etc., from the sensor assembly 8A, the current detected signal 8b from the current sensor 8B, the voltage detected signal 24a from the voltage detector 24A, the ground-fault detected signal 24b from the ground-fault detector 24B, and the sensor signals 31a, e.g., a vehicle speed signal, a radar signal, etc., from the vehicle sensor assembly 31. The A/D converter 25A converts each of these analog sensor signals into a digital sensor signal So, and supplies the digital sensor signal So to the comparator 25B.

The A/D converter 25A also supplies a display control signal KO1 corresponding to the sensor signal So, to the display driver 27 for displaying a condition corresponding to the sensor signal So on the display unit 33.

The comparator 25B compares the sensor signal So with the preset sensor reference value M1 stored in the memory 25C. If the sensor signal So exceeds the sensor reference value M1 (So>M1), then the comparator 25B supplies a display control signal KO2, corresponding to the compared signal Ho, to the display driver 27 for displaying a condition corresponding to the compared signal Ho on the display unit 33.

The timer gate 25D, which may comprise a timer circuit or the like, compares the continuation time $T_H$ with the timer reference value M2 sorted in the memory 25C. If the compared signal Ho continues for a period of time in excess of the timer reference value M2 ($T_H$>M2), then the timer gate 25D supplies the switch control signal Co to the switch controller 26.

The timer gate 25D also supplies the control signal C1 to the vehicle control ECU 32.

The switch control unit 26 comprises a 12 V-shunt drive control element 26A and a drive-voltage-shunt drive control element 26B, and actuates the switches Swa, Swb based on the switch control signal Co from the detector 25 and the switch control signal 32b from the vehicle control ECU 32.

When the switch control signal Co from the detector 25 is of a high level, the 12 V-shunt drive control element 26A and the drive-voltage-shunt drive control element 26B supply high-level switch drive signals D1, D2 to the respective switches Swa, Swb for thereby turning on respective phototransistors Qa, Qb of the switches Swa, Swb.

When the vehicle control ECU 32 determines that the drive power supply 6A is to be shut off due to a malfunction, for example, of the controller 22, based on the sensor signals 31a from the vehicle sensor assembly 31 and the control signals 23a, C1 which effect mutual monitoring on the vehicle control ECU 32 and the detector 25, the vehicle control ECU 32 outputs the switch control signal 32b. Based on the outputted switch control signal 32b, the 12 V-shunt drive control element 26A and the drive-voltage-shunt drive control element 26B supply switch drive signals D1, D2 to the respective switches Swa, Swb for thereby turning on the switches Swa, Swb.

The 12 V-shunt drive control element 26A and the drive-voltage-shunt drive control element 26B also supply display control signals Dc1, Dc2 corresponding to the switch drive signals D1, D2 to the display driver 27 for supplying the display drive signal 27a to the display unit 33 to display conditions corresponding to the switch drive signals D1, D2.

As described above, the circuit breaker 21 of the circuit breaker device 20 has two shunt coils Sh, Sl, the shunt coil Sh being connected to the drive power supply 6a and making up a closed loop through the contact Sa, the switch Swb, and the contact Sb, and the shunt coil Sl being connected to the accessory power supply 30 and making up a closed loop through the contact Sc and the switch Swa. When any of the various sensors including the sensor assembly 8A, the current sensor 8B, the voltage detector 24A, the ground-fault detector 24B, and the vehicle sensor assembly 31 detects a malfunction, the switches Swa, Swb are turned on based on the detected signal from the sensor and supply a current to the shunt coils Sh, Sl. The circuit breaker 21 is now actuated to open the contacts Sa~Sc, thereby shutting off the drive power supply 6A to cut off the electric energy supplied to the motor 29.

Furthermore, the control voltage $V_D$ for energizing the controller 22 is supplied from the accessory power supply 30 and the drive power supply 6A by the controller power supply unit 23. Therefore, even if the voltage of the accessory power supply 30 drops below a predetermined voltage as, for example, when the driver forgets to turn off lamps on the electric vehicle 11, the controller 22 can be continuously energized by the drive power supply 6A for monitoring the conditions of the electric vehicle 11 based on sensor signals from the sensors and actuating the circuit breaker 21 to turn off the drive power supply 6A in the event of any malfunction detected.

The battery box device 1 according to the present invention has been described with respect to a four-wheel electric vehicle. However, the principles of the present invention are also applicable to a battery box device for use on a two-or three-wheeled electrically driven vehicle.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A circuit breaker device for use on an electric vehicle, comprising:

a high-voltage drive power supply for supplying an electric energy to a load to drive the electric vehicle;

a circuit breaker for cutting off the electric energy supplied from said drive power supply to said load;

sensor means for detecting conditions of the electric vehicle;

control means for controlling operation of said circuit breaker in response to a detected signal from said sensor means;

a low-voltage accessory power supply for energizing accessories on the electric vehicle; and power supply converting means for converting the electric energy supplied from said drive power supply;

said control means being connected to said accessory power supply and also connected to said drive power supply through said power supply converting means, whereby said control means can be energized at all times by at least one of said accessory power supply and said drive power supply.

2. A circuit breaker device according to claim 1, wherein said circuit breaker includes a shunt coil connected to said drive power supply and a pair of first and second normally closed contacts which can be opened by said shunt coil when the shunt coil is energized by a current supplied from said drive power supply, said first and second contacts being connected to respective opposite terminals of said drive power supply and said load, and wherein said control means includes a switch having one terminal connected to said drive power supply through said shunt coil, said first contact, and one of the terminals of said drive power supply, thereby making a closed loop, and the switch having another terminal connected to said drive power supply through said second contact and the other of the terminals of said drive power supply, thereby making another closed loop, said control means including means responsive to the detected signal from said sensor means for turning on said switch to supply the current from said drive power supply to said shunt coil to energize the shunt coil for thereby opening said first and second contacts to actuate said circuit breaker.

3. A circuit breaker device for use on an electric vehicle, comprising:

a high-voltage drive power supply for supplying an electric energy to a load to drive the electric vehicle;

a circuit breaker having first and second shunt coils for cutting of the electric energy supplied from said drive power supply to said load;

sensor means for detecting conditions of the electric vehicle;

control means for controlling operation of said circuit breaker in response to a detected signal from said sensor means; and a low-voltage accessory power supply for energizing accessories on the electric vehicle;

said first shunt coil being connected to said drive power supply, and said second shunt coil being connected to said accessory power supply.

4. A circuit breaker device according to claim 3, wherein said control means is connected to at least said accessory power supply for being energized thereby.

5. A circuit breaker device according to claim 4, wherein said control means has power supply converting means for converting the electric energy supplied from said drive power supply and is connected to said drive power supply through said power supply converting means, whereby said control means can be energized at all times by at least one of said accessory power supply and said drive power supply.

6. A circuit breaker device according to claim 3, wherein said circuit breaker includes a pair of first and second normally closed contact which can be opened by said first shunt coil when the first shunt coil is energized by a current supplied from said drive power supply, said first and second contacts being connected to respective opposite terminals of said drive power supply and said load, and wherein said control means includes a first switch having one terminal connected to said drive power supply through said first shunt coil, said first contact, and one of the terminals of said drive power supply, thereby making a closed loop, and the first switch having another terminal connected to said drive power supply through said second contact and the other of the terminals of said drive power supply, thereby making another closed loop, said control means including means responsive to the detected signal from said sensor means for turning on said first switch to supply the current from said drive power supply to sad first shunt coil to energize the first shunt coil for thereby opening said first and second contacts to actuate said circuit breaker.

7. A circuit breaker device according to claim 6, wherein said circuit breaker includes a third normally closed contact which can be opened by said second shunt coil when the second shunt coil is energized by a current supplied from said drive power supply, and wherein said control means includes a second switch having one terminal connected to one terminal of said accessory power supply through said third contact and said second shunt coil thereby making a closed loop, and the second switch having another terminal connected to ground, said control means including means responsive to the detected signal from said sensor means for turning on said second switch to supply a current from said accessory power supply to said second shunt coil to energize the second shunt coil for thereby opening said first, second, and third contacts to actuate said circuit breaker.

8. A circuit breaker device according to claim 7, wherein said circuit breaker further includes a manual switch interlinked with said first, second, and third contacts for selectively turning on and off the first, second, and third contacts together.

9. A circuit breaker device according to claim 8, wherein said control means includes a controller power supply connected to said drive power supply and said accessory power supply, said controller power supply having power supply converting means for converting the electric energy supplied from said drive power supply.

10. A circuit breaker device according to claim 9, wherein said control means further includes a detector connected to said controller power supply for generating a switch control signal based on the detected signal from said sensor means and a control signal from a vehicle control unit on the electric vehicle, and a switch control unit responsive to said switch control signal for supplying drive signals respectively to said first and second switches to turn on the first and second switches.

11. A circuit breaker device according to claim 10, wherein said vehicle control unit includes means for monitoring operation of said control means, said switch control unit including means for receiving a switch control signal based on the control signal from the vehicle control unit when said control means is determined as malfunctioning by said vehicle control unit.

12. A circuit breaker device according to claim 9 or 10, wherein said control means further includes a display driver connected to said controller power supply, said display driver being connected to at least said detector for supplying a display drive signal to a display unit on the electric vehicle to cause the display unit to display information indicating that said control means is malfunctioning as determined by the vehicle control unit.

13. A circuit breaker device according to claim 1, 3 or 10, wherein said drive power supply includes a plurality of chargeable storage batteries said sensor means includes a gas sensor connected to said controller power supply for detecting an abnormal gas produced when said drive power supply is being charged.

14. A circuit breaker device according to claim 1, 3 or 10, wherein said sensor means includes a temperature sensor connected to said drive power supply for detecting an abnormal temperature of said drive power supply.

15. A circuit breaker device according to claim 9 or 10, wherein said sensor means includes a current sensor connected to said controller power supply for detecting an abnormal output current from said drive power supply.

16. A circuit breaker device according to claim 9 or 10, wherein said sensor means includes a voltage sensor connected to said controller power supply for detecting an abnormal output voltage from said drive power supply.

17. A circuit breaker device according to claim 9 or 10, wherein said sensor means includes a ground-fault sensor connected to said controller power supply for detecting a ground fault of said drive power supply.

18. A circuit breaker device according to claim 1 or 3, for use in a battery box device for use on an electric vehicle, the battery box device having a plurality of storage batteries as said drive power supply and a battery box housing the storage batteries, the battery box device further including a breaker box which houses said circuit breaker, said sensor means, and said control means, wherein the circuit breaker device and the storage batteries are separate from each other and mounted on the battery box.

* * * * *

UNITED STATES PATENT AND TRADEMARK OFFICE
CERTIFICATE OF CORRECTION

PATENT NO. : 5,510,658
DATED : April 23, 1996
INVENTOR(S) : Nakayama

It is certified that error appears in the above-indentified patent and that said Letters Patent is hereby corrected as shown below:

Column 14, line 21, after "supply to" delete "sad" and substitute -- said --.

Signed and Sealed this

First Day of October, 1996

Attest:

BRUCE LEHMAN

*Attesting Officer*          *Commissioner of Patents and Trademarks*